Dec. 19, 1967 G. M. STEIN 3,359,518
INTERLEAVED WINDINGS EFFECTING A UNIFORMLY
DISTRIBUTED SURGE POTENTIAL
Filed July 28, 1966 3 Sheets-Sheet 1
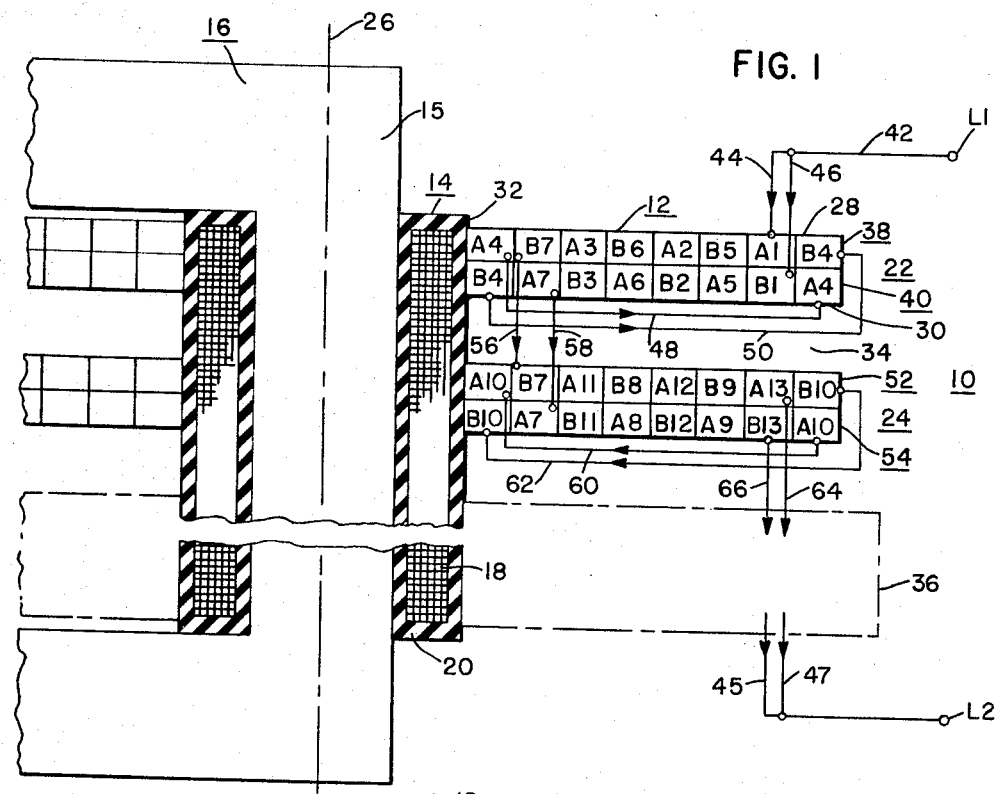
FIG. 1
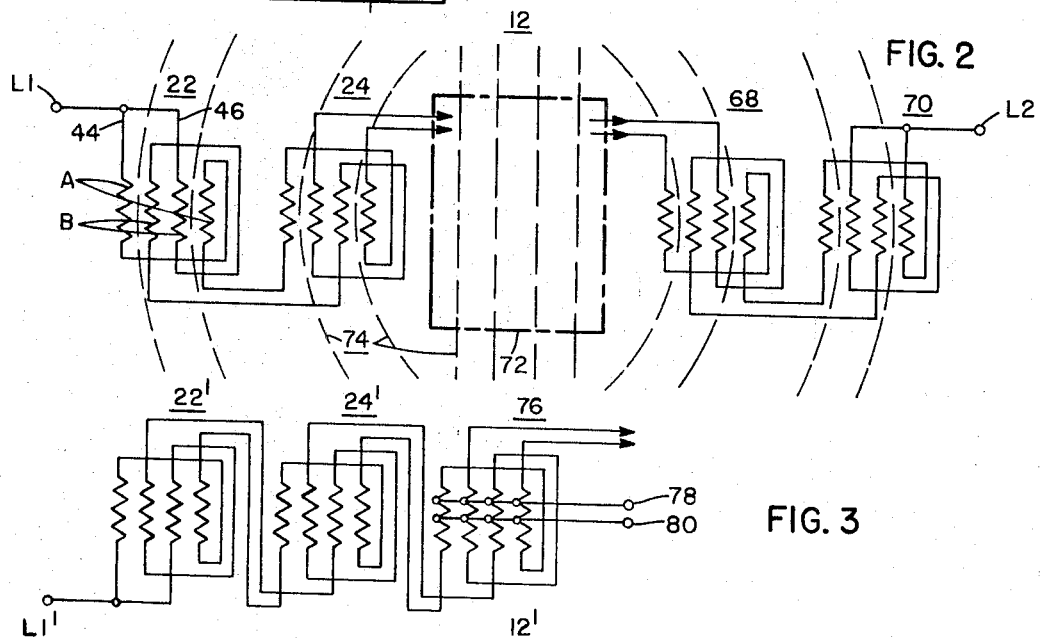
FIG. 2
FIG. 3
WITNESSES
Helen M. Farkas
James F. Young
INVENTOR
GERHARD M. STEIN
BY
Donald R. Lackey
ATTORNEY

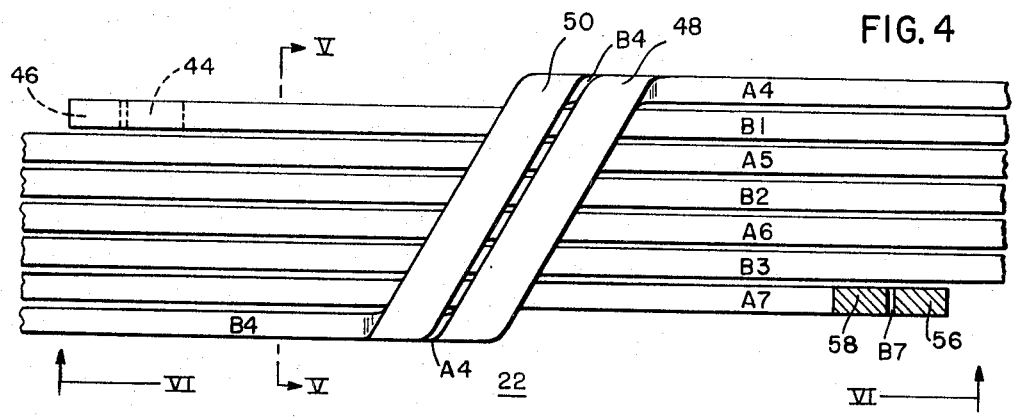
FIG. 4
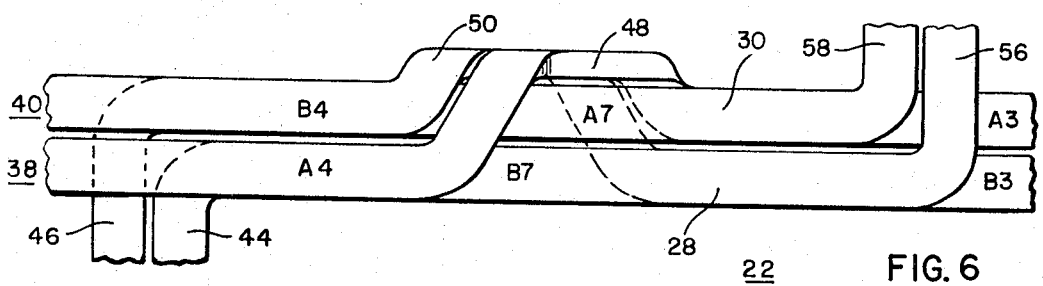
FIG. 6
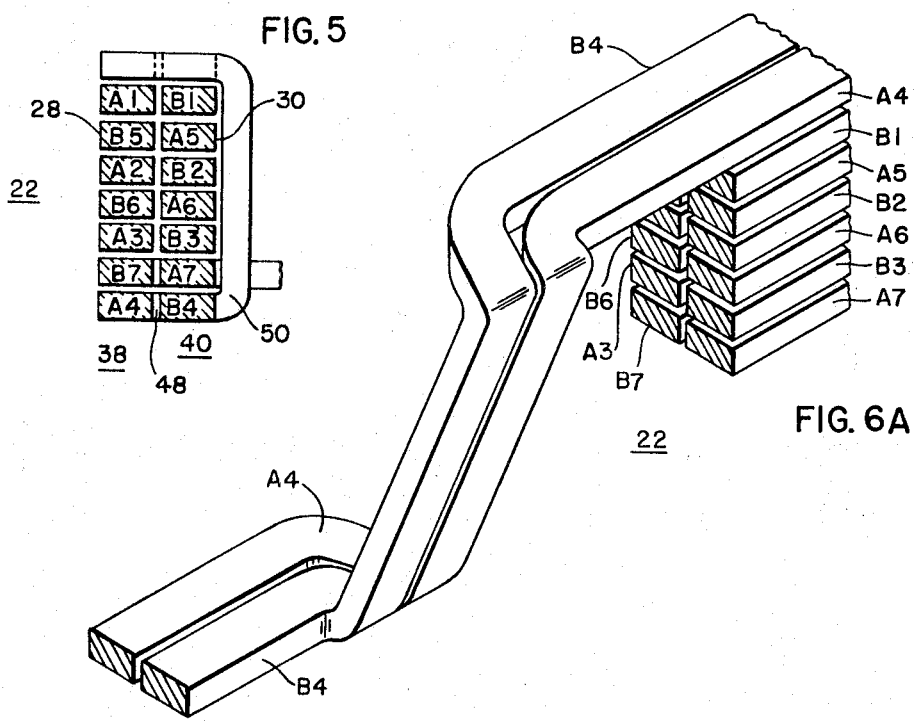
FIG. 5
FIG. 6A

United States Patent Office 3,359,518
Patented Dec. 19, 1967

3,359,518
INTERLEAVED WINDINGS EFFECTING A UNIFORMLY DISTRIBUTED SURGE POTENTIAL
Gerhard M. Stein, Sharon, Pa., assignor to Westinghouse Electric Corporation, Pittsburgh, Pa., a corporation of Pennsylvania
Filed July 28, 1966, Ser. No. 568,666
10 Claims. (Cl. 336—70)

This invention relates in general to a new and improved winding structure for electrical inductive apparatus, such as transformers, and more particularly to new and improved winding structures for interleaved type windings which have axially stranded conductors.

The electrical windings of certain types of electrical inductive apparatus are formed of a plurality of pancake type coils disposed in spaced side-by-side relation, and electrically connected to form a winding. In order to more uniformly distribute surge potentials across the winding, each pancake coil may have a plurality of sections, the turns of which are spirally wound together and interconnected to provide one or more series paths through the pancake coil which provide a higher series capacitance than if the pancake coil were to have but one section. In other words, electrically connected turns of the pancake coils are physically separated or interleaved by one or more other turns of the pancake coil.

As the current rating of an electrical winding is increased, the cross-sectional area of the electrical conductor must be increased accordingly. In order to reduce losses in the winding due to eddy currents, which vary with the square of the dimension of the conductor at right angles to the direction of the leakage flux, the dimension of the conductor at right angles to the direction of the leakage flux is reduced by sub-dividing the required cross-sectional conductor area into two or more conductive strands which are electrically insulated from one another, except at the start and finish of the winding, and at tap connection points on the winding. The reduction in eddy current losses by stranding the conductor may be offset by losses due to circulating currents in the parallel connected strands, however, if each strand is not subjected to the same net leakage flux. Therefore, it is common to transpose the relative positions of the strands with respect to the direction of the leakage flux, which is generally in the plane of the major surfaces of the pancake type coils, but which is distorted at the ends of the winding, and also at any tap connection points on the winding.

The conductor turns of which a pancake coil is wound may be stranded radially with respect to the axis of the pancake coil, axially or both. If the pancake coils are not of the interleaved turn, high series capacitance type, it is well known how to accomplish the transposition of either radially stranded conductors, axially stranded conductors, or both. If the winding is of the interleaved turn, high series capacitance type, and the stranding of the turns is only in the radial direction, there is also little difficulty in making the interconnections. If the winding is of the interleaved turn, high series capacitance type, and includes axial stranding of the turns, either alone or in combination with radial stranding, the problem of how to construct the interleaving connections so they do not mechanically interfere with one another, and at the same time perform a transposition of the strands relative to the direction of the leakage flux, is immediately apparent. In addition to the above, the interleaving connections must have a minimum dimension along the axis of the pancake coils and winding, in order to keep from increasing the width of the cooling ducts between the pancake coils beyond that required for adequate cooling. Increasing the duct width beyond that necessary for cooling purposes, places more electrical stress on the lower dielectric constant fluid coolant in the ducts, and also increases the length of the electrical and magnetic circuits.

Accordingly, it is an object of the invention to provide a new and improved winding structure for electrical inductive apparatus.

Another object of the invention is to provide a new and improved pancake coil structure for interleaved turn, high series capacitance windings.

A further object of the invention is to provide a new and improved pancake coil structure having radially interleaved, axially stranded conductor turns, which performs the interleaving connections between different radial sections without mechanical interference, and simultaneously performs a transposition of the conductor strands.

Still another object of the invention is to provide a new and improved pancake coil structure having axially stranded conductors and interleaved turns, in which the interleaving connections for each pancake coil require a total axial length equal to the thickness of one of the conductive strands.

Briefly, the present invention accomplishes the above-cited objects by constructing the interleaving connections which connect the axially disposed strands of different radial sections of a pancake coil to successively occupy three different planes. The first and third planes include the ends of the strands of the two radial sections to be interconnected, respectively, which planes are substantially parallel with one another, and the second plane is parallel to and adjacent one of the major surfaces of the pancake coil, and is substantially perpendicular to the first and third planes.

More specifically, the interleaving connections are connected to the ends of the axially disposed strands of one of the radial sections, and are then bent in predetermined spaced relation in a common direction, and in a common plane which includes the portion of these strands immediately adjacent their ends. Upon clearing the side of the pancake coil, the connections are all bent in spaced relation in a second common plane, parallel to the adjacent surface of the pancake coil, and towards the portion of the pancake coil which contains the ends of the strands of the radial section to which they are to be connected. Upon reaching the plane occupied by the ends of the radial section to be connected, the interleaving connections are bent to enter this plane and proceed to a strand which is in 180 degree rotational symmetry with its position in the other radial section. Upon reaching this new strand position, the interleaving connections are bent into alignment with the ends of the strands and connected thereto.

Further objects and advantages of the invention will become apparent from the following detailed description, taken in connection with the accompanying drawings, in which:

FIGURE 1 is a partial sectional elevation of the magnetic core and windings of a transformer which may utilize the teachings of the invention;

FIG. 2 is a schematic representation of the winding arrangement of the transformer shown in FIGURE 1;

FIG. 3 is a schematic diagram illustrating another winding arrangement which may utilize the teachings of the invention;

FIG. 4 is an elevational view illustrating interleaving connections for the transformer shown in FIGURE 1, constructed according to the teachings of the invention;

FIG. 5 is a cross-sectional view of the interleaving connections of FIG. 4 taken along the line V—V;

FIG. 6 is a view of the inside interleaving connections of FIG. 4, taken in the direction of arrows VI—VI;

FIG. 6A is a perspective view of the interleaving connections shown in FIGS. 4, 5 and 6;

Figure 8:
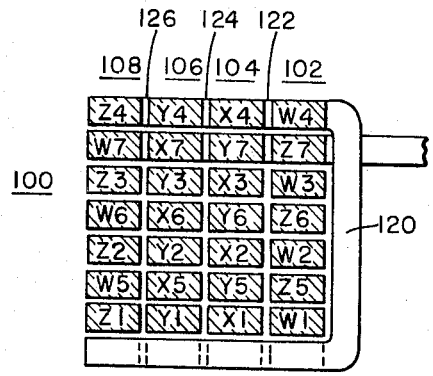
FIG. 8 is a cross-sectional view of the interleaving connections of FIG. 7, taken along the line VIII—VIII.

Referring now to the drawings, and FIGURE 1 in particular, there is shown a partial elevational view of a transformer 10 which may utilize the teachings of the invention. Transformer 10, which may be of core-form type illustrated, includes high and low voltage winding assemblies 12 and 14, respectively, concentrically disposed about a leg 15 of a magnetic core assembly 16. Transformer 10 may be single or polyphase, with only one phase shown in FIGURE 1 in order to simplify the drawings.

The low voltage winding 14 may be of any conventional type, including a plurality of conductor turns 18, which are separated from high voltage winding 12 by insulating means 20.

High voltage winding 12 includes a plurality of pancake or disk type coils, such as pancake coils 22 and 24, which are disposed in spaced side-by-side relation about the center line 26 of magnetic core leg 15, with center line 26 also indicating the axis of the pancake coils 22 and 24. Each pancake coil, such as pancake coil 22, has first and second outer major opposed surfaces 28 and 30, respectively, and a central opening 32 for receiving the associated leg of magnetic core assembly 16. The plurality of pancake coils are stacked with their openings in alignment, and they are axially spaced along coil axis 26 in order to provide cooling ducts, such as cooling duct 34, between the various pancake coils. The magnetic core-winding assembly of transformer 10 is disposed in a suitable casing (not shown), and may be filled with a suitable fluid insulating and cooling medium, such as oil or $SF_6$.

The various pancake coils, of which only two are shown, with the remainder being indicated generally at 36, are serially connected to complete the high voltage winding 12.

In order to increase the series capacitance of the various pancake coils and the winding 12, and also reduce the eddy current losses of the winding 12, each pancake coil may have two or more radial sections, with the conductor turns of the radial sections being interleaved in a predetermined manner to increase the series capacitance of the pancake coil, and with the conductor turns of the sections being formed of sub-divided or stranded conductors. There are many interleaving arrangements which may be used to increase the series capacitance of the pancake type coils, in order to provide a more favorable distribution of surge potentials across the pancake type coils and then across the complete winding structure. For example, see United States Patent 3,090,022, issued May 14, 1963, which is assigned to the same assignee as the present application.

In order to increase the current rating of the winding and reduce losses due to eddy currents, the conductors of which the radial sections of the pancake coils are wound are sub-divided or stranded. If the stranding of the conductor is radial, with all of the strands and conductor turns of the sections being in the same plane, the interleaving connections may be made as taught by the hereinbefore mentioned U.S. Patent 3,090,022. If the stranding of the conductor turns is axial, or both axial and radial, however, with respect to the axis 26 of the pancake coils, the relative positions of the conductive strands should be transposed with respect to the direction of the leakage flux, at least in the pancake coils in which the leakage flux is not parallel to the planes of the major opposed surfaces of the pancake coils. The leakage flux, while being generally parallel to the major surfaces of the pancake coils, is distorted or curved at the ends of the winding structure, and also at any interruptions in the pancake coils, such as at tap connection points. Thus, when the conductor turns are axially stranded, at least the pancake coils near the ends of the winding structure, and the pancake coils in the tapped sections, should include transpositions of the conductive strands. The remaining pancake coils may also include transpositions, if desired, but the necessity is not as great as in portions of the winding where the leakage flux is distorted.

FIGURE 1 illustrates an example of winding 12 which may utilize the teachings of the invention. Each pancake coil, such as pancake coil 22, has two radial sections, in this example, formed by spirally winding two electrical conductors together about coil axis 26, forming two sections having radially interleaved turns, with each section having first and second ends. In order to increase the current carrying capacity of winding 12, each section is formed of an electrical conductor having two side-by-side or axially disposed conductive strands, thus forming a pancake coil having two axial sections, such as axial sections 38 and 40 in pancake coil 22. Thus, pancake coil 22 has two radial sections and two axial sections, formed by spirally winding two conductors together which have two axially disposed conductive strands. Or, each axial section 38 and 40 may be formed separately by winding two radially disposed conductors together which have a single conductive strand, and then disposing them in side-by-side relation and connecting them in parallel as will be hereinafter explained.

The main conductor 42, connected to line terminal L1, is "split" into two conductive strands 44 and 46 and, in this instance, enter the end turns of two side-by-side radial sections in axial sections 38 and 40, respectively. As shown, the various pancake coils of winding 12 are start-start, finish-finish connected, but they may be finish-start connected if desired. As used throughout this specification, the "start" of a pancake coil is the end of the inner turn, and the "finish" is the end of the outer turn, regardless of where the pancake coil is first entered by external conductors. In this instance, conductors 44 and 46 enter pancake coil 22 at the "finish" and of one of its radial sections, and it spirals inwardly, with conductor 44 being connected to the radial section of axial section 38, which includes turns A1, A2, A3 and A4, and conductor 46 being connected to the radial section of axial section 40, which includes turns B1, B2, B3 and B4. The series circuit, of which conductor 44 is a part, will be called the "A" circuit, and the series circuit of which conductor 46 is a part will be called the "B" circuit. Upon reaching the end of the inner turns of their respective radial and axial sections, instead of returning to serially connect the remaining radial section of each axial section with the other radial section of the same axil section, it is desirable to transpose the relative positions of the strands, with the A circuit of axial section 38 proceeding to the adjacent axial section 40, and the B circuit of axial section 40 proceeding to the adjacent axial section 38. Thus, the inner end of turn A4 of axial section 38 is connected to the outer end of turn A4 of axial section 40 via conductor 48. The turns of each axial section which are connected together by the interleaving connections are given the same numbers to indicate that they are substantially at the same potential. In like manner, the inner end of turn B4 of axial section 40 is connected to the outer end of turn B4 of axial section 38 via conductor 50. The A circuit thus spirals through axial section 40, through the radial section which includes turns A4, A5, A6 and A7. The B circuit spirals through axial section 38, which includes turns B4, B5, B6 and B7. It will be noted that in every instance, an electrically similar turn of the A circuit is always adjacent to an electrically similar turn of the B circuit, with the A and B circuits appearing in alternately crossed positions from turn to turn of pancake coil 22, providing a transposition in which each of the circuits is subjected to substantially the same net leakage flux, which reduces circulating currents and the accompanying circulating losses to a minimum.

After pancake coil 22 is completed the two conductors of the A and B series circuit may be connected together if desired, but it is preferable to continue them throughout the winding as separate series circuits, only being connected together at the start and finish ends of the winding, and at the tap connection points, if the winding is tapped. Thus, conductors 45 and 47 are connected together at the finish end of the winding at terminal L2. This has the advantage of lengthening the parallel loops, which increases the resistance of the loop, and reduces the magnitude of circulating currents accordingly.

Pancake coil 24 is similar to pancake coil 22, but since, in this instance, the pancake coils are illustrated as being start-start and finish-finish connected, the turns of the radial sections of pancake coil 24 spiral outwardly, just as they are formed by machine winding the turns on a mandrel. The turns of pancake coil 22 spiral inwardly, since the winding enters the normal "finish" of the coil, requiring that pancake coil 22 be rewound by hand after normal machine winding.

Thus, the B circuit enters the inner end of one of the radial sections of one of the axial sections via conductor 56, such as axial section 52 of pancake coil 24, and the A circuit enters the inner end of the same radial section, but in axial section 54, via conductor 58, and they spiral outwardly together, with the A circuit appearing at turns A7, A8, A9 and A10 of axial section 54, and the B circuit appearing at turns B7, B8, B9 and B10 of axial section 52. The A circuit then returns to the start of the inner turn of the remaining radial section in the opposite axial section 52 via conductor 60, and spirals outwardly, appearing at turns A10, A11, A12 and A13. The B circuit returns to the start of the inner turn of the remaining radial section in the opposite axial section 54 via conductor 62, and spirals outwardly, appearing at turns B10, B11, B12 and B13. The A circuit proceeds to the next adjacent pancake coil, designated generally at 36 via conductor 64, and the B circuit also proceeds to the same pancake coil via conductor 66.

FIG. 2 is a schematic representation of winding 12 of transformer 10, illustrating the direction of the leakage flux relative to the various pancake coils of winding 12. The first two pancake coils 22 and 24 of winding 12, as well as the final two pancake coils are shown in FIG. 2, with the pancake coils in the middle portion of the winding being shown generally at 72. The leakage flux is shown with dotted lines 74. In general, the leakage flux is parallel with the major surfaces of the pancake coils, as shown relative to the pancake coils shown generally at 72. At the ends of the winding 12, however, the flux lines are curved, making a transposition of stranded parallel connected conductors necessary in order to reduce losses due to circulating currents. It will be noted in FIG. 2 that each pancake coil, such as pancake coil 22, includes four sections, with the sections being connected to provide two separate series paths through the pancake coils. The number of pancake coils at each end of the winding which require that their conductive strands be transposed will be determined by the particular parameters of the winding structure utilized.

As hereinbefore stated, winding 12 may also be finish-start connected. FIG. 3 illustrates pancake coils 22' and 24' of winding 12' connected finish-start, and also a pancake coil 76 illustrating tap connections 78 and 80 thereon. Tapped coils require that their various conductive strands to be transposed regardless of their position in the winding, due to the distortion of the leakage flux in the tapped coil sections, and also due to the fact that the parallel loops are shortened considerably, which reduces the impedance of the loops to the flow of circulating currents.

Thus, it has been established that it is desirable to transpose the conductive strands of an interleaved turn type pancake coil when the strands are not all in a common plane, and the leakage flux is not parallel to the major surfaces of the pancake coil. The various radial and axial sections of each pancake coil must be interconnected with interleaving connections to provide the high series capacitance, and the relative positions of the conductive strands must be transposed by these interleaving connections relative to the axis of the coil, at least in certain of the pancake coils of an electrical winding. The interleaving connections should automatically provide the desired transposition without mechanical interference between the connections, and without one interleaving connection crossing over another interleaving connection, in order to prevent the conductors which form the interleaving connections from mechanically abrading the insulation which surrounds and protects these interleaving connections. Further, the axial distance required to make the interleaving connections and transpositions should not exceed the thickness of one conductive strand, in order to maintain the duct width between adjacent pancake coils at a minimum.

FIG. 4 is a side elevational view of a portion of pancake coil 22 shown in FIGURE 1, illustrating interleaving connections constructed according to the teachings of the invention, which accomplish the desired objectives and results. FIGS. 5 and 6 will also be referred to when describing the interleaving connections, which show cross-sectional and bottom plan views, respectively, of the interleaving connections shown in FIG. 4.

Pancake coil 22 starts with conductors 44 and 46 entering the outer ends of adjacent strands of one radial section in axial sections 38 and 40, respectively, and spiraling to the inner ends of the sections, at which point conductors 48 and 50 are connected to ends of turns A4 and B4, respectively. Conductors 48 and 50, after connecting to the inner ends of conductor turns A4 and B4 in axial sections 38 and 40, respectively, are bent in predetermined spaced relation in a first plane which is the same plane occupied by the inner ends of turns A4 and B4, until reaching a second plane transverse to the first plane, which is in spaced parallel relation with one of the major outer surfaces of pancake coil 22, which in this instance is major surface 30. Conductors 48 and 50, still in spaced relation, are bent into the second plane towards the outer edge of pancake coil 22, and they proceed in spaced parallel relation in this plane until reaching a third plane transverse to the second plane, which third plane includes the outer ends of the axial strands of the remaining radial section. Conductors 48 and 50, still in spaced relation, are bent into the third plane to connect to the ends of outer turns A4 and B4 in axial sections 40 and 38 respectively. Thus, the A circuit is transposed from axial section 38 to axial section 40, and B circuit is transposed from axial section 40 to axial section 38, while the interleaving connections are being made which increase the series capacitance of the pancake coil. It will be noted that interleaving connections 48 and 50 never cross one another, maintaining a predetermined spaced relationship in all three planes, and they are both in a common plane transverse to the coil axis while in duct 34, proceeding from the inner edge to the outer edge of the pancake coil, requiring the axial space of a single conductive strand. The A and B circuits continue in their new axial sections until reaching the inner ends of turns A7 and B7 at which point they may be connected to conductors 58 and 56, respectively, for connection to the "start" end of the adjacent pancake coil.

FIG. 6A is a perspective view of the interleaving connections shown in FIGS. 4, 5 and 6, and has been included to aid in the understanding of the construction of the connections. Like reference numerals refer to like components.

Interleaving connections constructed according to the teachings of the invention may also be applied to conductors wound in a direction opposite to that shown in FIGS. 4, 5 and 6, in which case the connections would be a mirror image of those shown in FIGS. 4, 5 and 6. Further, the teachings of the invention may be applied to a conductor having any number of axial strands.

Figure 7:
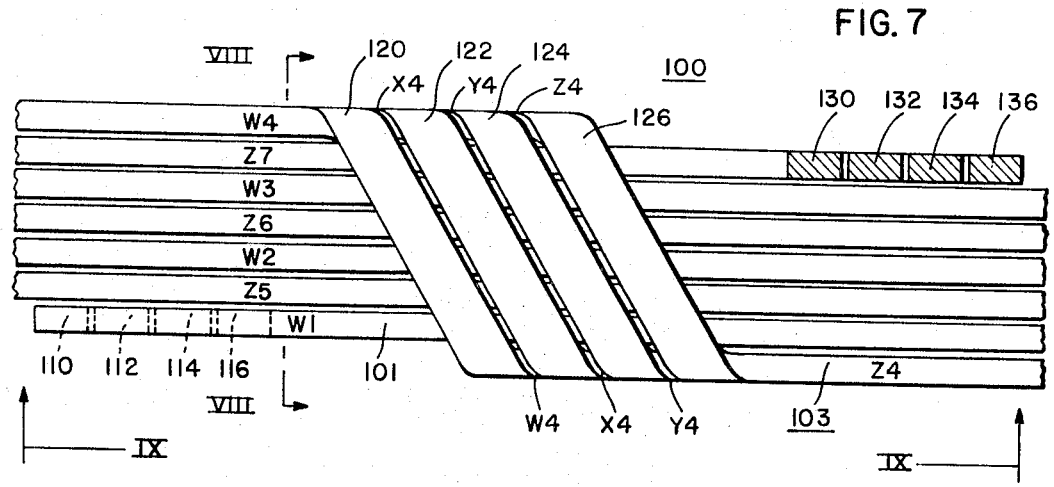
FIG. 7 is an elevational view illustrating interleaving connections constructed according to the teachings of the invention for a large plurality of conductive strands.
Figure 9:
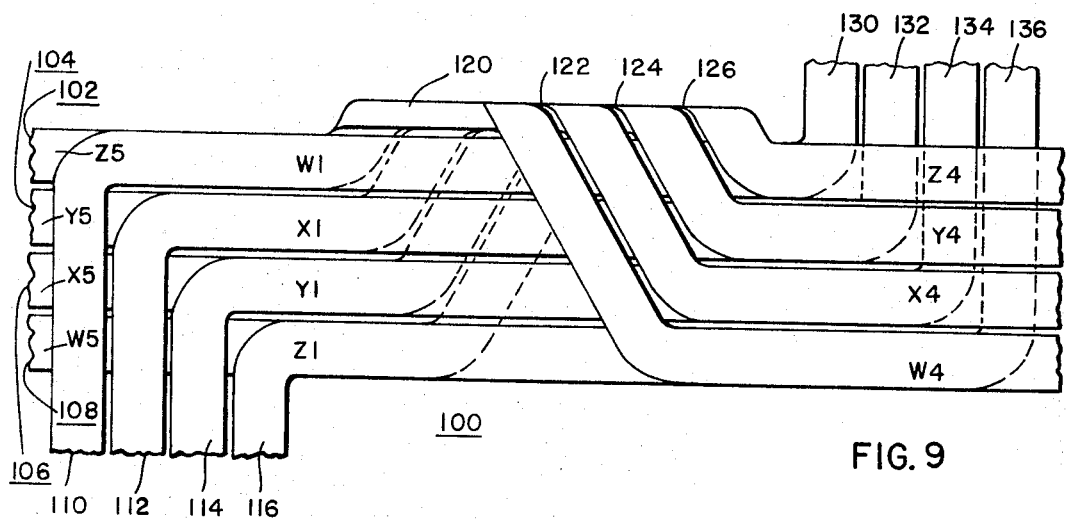
FIG. 9 is a plan view of the inside interleaving connections of FIG. 7, taken in the direction of the arrows IX—IX.

In order to illustrate the application of the teachings of the invention to an axially stranded conductor having more than two axial strands wound in a direction opposite to pancake coil 22 of FIG. 4, and also to illustrate its use with finish-start connected pancake coils, FIGS. 7, 8 and 9 have been included, which illustrate a portion of a pancake coil 100 having radially interleaved sections formed by two electrical conductors, each having four axially disposed conductive strands. FIG. 7 is an elevational view of a portion of pancake coil 100 illustrating the interleaving connections, and FIGS. 8 and 9 are views of the interleaving connections shown in FIG. 7, taken along the lines VIII—VIII and IX—IX, respectively.

More specifically, FIGS. 7, 8 and 9 illustrate a pancake coil 100 in which two electrical conductors 101 and 103 are radially wound together about a predetermined axis, with each conductor having four axially disposed strands, forming axial sections 102, 104, 106, and 108. Pancake coil 100 has its radial and axial sections interconnected to form four series circuits, which shall be called circuits "W," "X," "Y" and "Z." Pancake coil 100 starts, in this instance, at the inner ends of one of the radially interleaved conductors, such as conductor 101, with the connecting conductors 110, 112, 114 and 116 entering axial secitons 102, 104, 106 and 108, respectively, as shown in FIGS. 7 and 9, to start the series circuits W, X, Y and Z, respectively. The outer ends of conductor 101 are connected to the inner ends of conductor 103, by interleaving connections 120, 122, 124 and 126, which automatically transpose the relative positions of the strands such that they are in 180° rotational symmetry with their prior locations. In other words, the W circuit is transposed from axial section 102 to axial section 108, the X circuit is transtransposed from axial section 104 to axial section 106, the Y circuit is transposed from axial section 106 to axial section 104, and the Z circuit is transposed from axial section 108 to 102.

Thus, each conductive strand spirals outwardly until coming to the end of its radial section, and is returned to an axial section which is in rotational symmetry with its previous axial position, and then again spirals outwardly to the end of the new radial section. For example, circuit W spirals outwardly in axial section 102, appearing at turns W1, W2, W3 and W4, and then is returned to the start of one of the radial sections in axial section 108, appearing at turns W4, W5, W6 and W7 as it spirals outwardly in its radial section of axial section 108.

In the construction of the interleaving connections, the outer end of turn W4 in axial section 102, which is adjacent the major surface of the pancake coil which the interleaving connections are to be disposed immediately adjacent to, is connected to interleaving connection 120, and interleaving connection 120 then proceeds to axial section 108. The end of outer turn X4 of axial section 104 is connected via interleaving connection 122 to the inner end of turn X4 in axial section 106. The end of outer turn Y4 of axial section 106 is connected via interleaving conductor 124 to the inner end of turn Y4 in axial section 104. And, the end of outer turn Z4 of axial section 108 is connected via interleaving connection 126 to the inner end of turn Z4 in axial section 102. The series circuits W, X, Y and Z again spiral outwardly in their new radial sections, and in their new axial sections, until reaching the outer ends of conductor 103, at which point conductors 130, 132, 134 and 136 are connected to the ends of turns Z7, Y7, X7, and W7, respectively, for connection to an adjacent pancake coil. Thus, the interleaving connections 120, 122, 124 and 126 and pancake coil 100, like the interleaving connections 48 and 50 and pancake coil 22 of FIG. 4, follow three predetermined planes, with two of the planes being substantially parallel to one another and including the ends of the strands of the two conductors 101 and 103 to be connected, and the third plane being substantially transverse to the other two planes, and being spaced from and parallel to one of the major outer surfaces of this associated pancake coil.

In summary, there has been disclosed a new and improved winding structure for electrical windings having pancake coils which have a plurality of radial sections, the turns of which are interleaved to increase the series capacitance of the windings, and in which the conductors which form the radial sections are stranded, at least in axial direction with respect to the axis of the pancake coils. The invention applies to any type of interleaving arrangement to increase the series capacitance of the pancake coils, and it applies to coils in which the conductor turns are stranded both radially and axially, in addition to coils which are stranded only axially. Interleaving connections formed according to the teachings of the invention automatically provide the transposition in which the positions of the strands are transposed relative to the direction of the leakage flux, with the strands occupying a position after transposition which is in 180° rotational symmetry with their prior positions. The interleaving connections, being in spaced parallel relation throughout three distinct planes, never cross one another, and never interfere with one another mechanically. Further, the interleaving connections, regardless of the number of axial strands, never require more axial duct space than the width of one interleaving connection.

Since numerous changes may be made in the above-described apparatus and different embodiments of the invention may be made without departing from the spirit thereof, it is intended that all matter contained in the foregoing description or shown in the accompanying drawings, shall be interpreted as illustrative, and not in a limiting sense.

I claim as my invention:

1. A winding for electrical inductive apparatus comprising
   a plurality of serially connected pancake coils having first and second major opposed surfaces and disposed in spaced side-by-side relation to form a winding structure having first and second ends,
   at least one of said pancake coils having a plurality of radially interleaved sections, each having a plurality of spirally wound turns formed of an electrical conductor,
   the electrical conductor of each of said radially interleaved sections having a plurality of axially disposed conductive strands having first and second ends, dividing each radially interleaved section into a plurality of axially disposed sections,
   and means electrically connecting the second ends of the conductive strands of the axially disposed sections of at least one of said radially interleaved sections with the first ends of the conductive strands of the axially disposed sections of a different radially interleaved section, with the electrically connected axially disposed sections of the different radially interleaved sections being in rotational symmetry with one another,
   said means including a plurality of spaced electrical conductors disposed to successively occupy first, second and third common planes, with said first common plane including the second ends of the axially disposed conductive strands of said at least one radially interleaved section, said second plane being in parallel relation adjacent one of the major opposed outer surfaces of said at least one pancake coil, and said third common plane including the first ends of the axially disposed conductive strands of said different radially interleaved sections.

2. The winding of claim 1 wherein said at least one pancake coil has two radially interleaved sections and a plurality of axially disposed sections.

3. The winding of claim 1 wherein said at least one pancake coil has a plurality of radially interleaved sections and two axially disposed sections.

4. The winding of claim 1 wherein said at least one pancake coil has two radially interleaved sections and two axially disposed sections.

5. The winding of claim 1 wherein said at least one pancake coil has a plurality of tap connections thereon.

6. The winding of claim 1 wherein said plurality of pancake coils are finish-start connected.

7. The winding of claim 1 wherein said plurality of pancake coils are finish-finish, start-start connected.

8. The winding of claim 1 wherein a predetermined number of pancake coils adjacent the first and second ends of the winding structure are constructed similar to said at least one pancake coil.

9. The winding of claim 8 wherein the first ends of one of the radially interleaved sections are connected together in the pancake coil at the first end of the winding structure, and the second ends of one of the radially interleaved sections are connected together in the pancake coil at the second end of the winding structure.

10. The winding of claim 8 wherein at least one of said plurality of pancake coils has tap connections thereon, said at least one tapped pancake coil being constructed similar to said predetermined number of pancake coils adjacent the first and second ends of said winding structure.

References Cited
UNITED STATES PATENTS 3,090,002  5/1963  Stein _____ 336—70

FOREIGN PATENTS 1,222,757  1/1960  France.
786,126  11/1957  Great Britain.

LEWIS H. MYERS, *Primary Examiner.*

T. J. KOZMA, *Assistant Examiner.*